US009299322B2

(12) United States Patent
Naveh

(10) Patent No.: US 9,299,322 B2
(45) Date of Patent: Mar. 29, 2016

(54) RENDERING TEXTS ON ELECTRONIC DEVICES

(71) Applicant: Facebook, Inc., Menlo Park, CA (US)

(72) Inventor: Barak Reuven Naveh, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/705,125

(22) Filed: May 6, 2015

(65) Prior Publication Data

US 2015/0235627 A1 Aug. 20, 2015

Related U.S. Application Data

(63) Continuation of application No. 13/289,195, filed on Nov. 4, 2011, now Pat. No. 9,082,339.

(51) Int. Cl.
*G06T 11/00* (2006.01)
*G09G 5/24* (2006.01)

(52) U.S. Cl.
CPC .................. *G09G 5/24* (2013.01); *G09G 5/246* (2013.01); *G09G 2340/14* (2013.01); *G09G 2370/022* (2013.01)

(58) Field of Classification Search
None
See application file for complete search history.

(56) References Cited

U.S. PATENT DOCUMENTS

| | | | | |
|---|---|---|---|---|
| 5,625,773 | A * | 4/1997 | Bespalko et al. | 345/467 |
| 5,940,084 | A * | 8/1999 | Motokado et al. | 345/468 |
| 2008/0238927 | A1* | 10/2008 | Mansfield | 345/467 |
| 2014/0152670 | A1* | 6/2014 | Miyamoto et al. | 345/467 |

* cited by examiner

*Primary Examiner* — David H Chu
(74) *Attorney, Agent, or Firm* — Baker Botts L.L.P.

(57) ABSTRACT

In one embodiment, dividing a set of texts into one or more text blocks, each text block including a portion of the set of texts; rendering each text block to obtain one or more rendered text blocks; determining a placement instruction for each rendered text block, the placement instruction indicating a position of the rendered text block when it is displayed; and sending the one or more rendered text blocks and their respectively associated placement instructions to an electronic device for displaying on the electronic device.

15 Claims, 6 Drawing Sheets

RENDERING TEXTS ON ELECTRONIC DEVICES

PRIORITY

This application is a continuation under 35 U.S.C. §120 of U.S. patent application Ser. No. 13/289,195, filed 4 Nov. 2011.

TECHNICAL FIELD

This disclosure generally relates to rendering and displaying texts on electronic devices.

BACKGROUND

For any type of electronic devices that incorporates display screens, it is most likely that some texts need to be rendered and displayed on the screens of the devices while the devices are operational. The texts may be in various languages or of various font styles.

DESCRIPTION OF EXAMPLE EMBODIMENTS

In particular embodiments, texts are rendered for display on the screen of an electronic device. For example, the electronic device may be a desktop computer, a game or test console, or a mobile device (e.g., a notebook computer, a network computer, a tablet computer, a mobile telephone, or a personal digital assistant). The texts may be in any language or font style. In particular embodiments, a set of texts (e.g., a word, a phrase a sentence, or a paragraph) is divided into a number of text blocks, with each text block including a portion of the texts. Each text block is rendered for display (e.g., as a bitmap or raster image) on the screen of the electronic device. Optionally, each rendered text block is compressed. In addition, an placement instruction is determined for each rendered text block, which indicates the position of the rendered text block (e.g., an offset in relation to a reference coordinate) when the text block is displayed on the screen of the electronic device. The rendered text blocks and their respectively associated placement instructions are sent to the electronic device to be displayed.

For any electronic device that includes a screen, it is likely that some texts need to be displayed on the screen of the device while the device is operational. The texts may be in any written language or any font style. While it is relatively easy to render and display some languages (e.g., English, French, German, Spanish, or Italian) on electronic devices, other languages may present additional problems and challenges. For example, some languages are written from right to left (e.g., Hebrew) or top to bottom (e.g., traditional Chinese). Some languages are character based (e.g., Chinese) or script based (e.g., Arabic or Hindi). Some languages have complicated alphabets (e.g., Arabic, Thai, Hindi). Rendering and displaying texts written in such complex languages may require complicated analysis, computation, or processing. On the other hand, certain types of electronic devices, such as low-end mobile telephones, may not possess sufficient resources (e.g., processor power or memory) to adequately render texts written in such complex languages. For example, it may take a very long time to render such texts that results in inconvenient or unacceptable delays to the user of the device.

For some languages, especially the more complex languages, it may not be feasible, or feasible but inefficient, to store all the font representations of that language, along with the rendering logic, on a client device. The number of character combinations can be very large, and handling such languages may consume a great amount of resources of the client device. The rendering logic needed for rendering texts in such languages may be very complex and involved, thus consuming a lot of device resources (e.g., in terms of processing power and memory).

Figure 1:
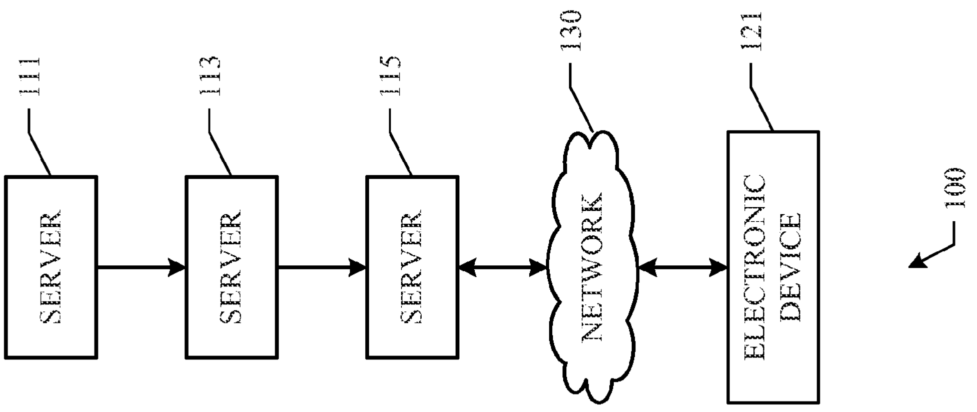
FIG. 1 illustrates an example system for rendering and displaying texts on electronic devices.

FIG. 1 illustrates an example system 100 for rendering and displaying texts on electronic devices. This system is suitable for displaying texts written in any language or any font and on any electronic device with a screen. In particular embodiments, system 100 may include a number of servers (e.g., servers 111, 113, 115). Each server may be a unitary server or may be a distributed server spanning multiple computers or multiple datacenters. Each server may include hardware, software, or embedded logic components or a combination of two or more such components and capable of carrying out the appropriate functionalities implemented or supported by the server. In some implementations, each server may implement different functionalities. For example, server 111 may be a "content" server that is responsible for creating, collecting, or compiling the texts to be displayed on various electronic devices. As an example, upon receiving a request for a web page, server 111 may dynamically construct the requested web page, which may include some texts. Server 113 may be a "gateway" server that is responsible for processing the texts. This may include adapting the texts for a specific device where the texts are to be displayed, or rendering the texts (e.g., as bitmap or raster images) for a specific type of device. Server 113 may receive texts for further processing from server 111. Server 115 may be a "language" server that is responsible for further processing the rendered texts based on their written structure, such as dividing the texts into text blocks and determining the placement instruction for each text block. Server 115 may receive the rendered texts for further processing from server 115.

Note that for different implementations, the specific functionalities implemented by each server 111, 113, 115 may differ. For example, in some implementations, the functionalities of servers 113 and 115 (e.g., rendering texts, dividing texts into text blocks and determining placement instruction for each text block) may be combined to be implemented by the same server. In some implementations, some functionalities may be optimized. The functionalities implemented by servers 111, 113, and 115 are described in more detail below in connection with FIG. 2.

In particular embodiments, server 115 may send text blocks and their associated placement instructions to an electronic device 121 (i.e., a client device) over a computer or communications network 130 (e.g., the Internet) so that electronic device 121 may display the corresponding texts on its screen. In particular embodiments, electronic device 121 may include hardware, software, or embedded logic components or a combination of two or more such components and capable of carrying out the appropriate functionalities implemented or supported by electronic device 121. In some implementations, electronic device 121 may be a mobile device, such as, for example and without limitation, a notebook, netbook, or tablet computer, a mobile telephone, or a game or test console, which may connect to network 130 wirelessly. For example, if electronic device 121 is a mobile telephone, it may connect to a second generation (2G), third generation (3G), or fourth generation (4G) cellular network.

In particular embodiments, servers 111, 113, and 115 may be a part of a social-networking system, which implements and hosts a social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. Each user of the social-networking system may maintain any number of user accounts with the system. Each user account is identified by a unique user identifier (ID) or username, and access to the user account may be controlled by a password. To log into a specific user account, a user needs to provide the correct combination of user ID and password associated with the account.

In particular embodiments, a user of electronic device 121 may be such a user of the social-networking system. In some implementations, the user of electronic device 121 may register or link electronic device 121 to his user account with the social-networking system. For example, the user may specify the serial number, Internet Protocol (IP) address, or Media Access Control (MAC) address of electronic device 121, or if electronic device 121 is a mobile telephone, the telephone number assigned to electronic device 121 in his user account with the social-networking system. In addition, the user may specify his preferred language (e.g., English, French, Russian or Chinese) for communication. This information may also be stored with his user account and thus accessible to the social-networking system and its servers (e.g., servers 111, 113, and 115). In some cases, such information may help processing and rendering the texts to be displayed on electronic device 121, as described in more detail below in connection with FIG. 2.

Figure 2:
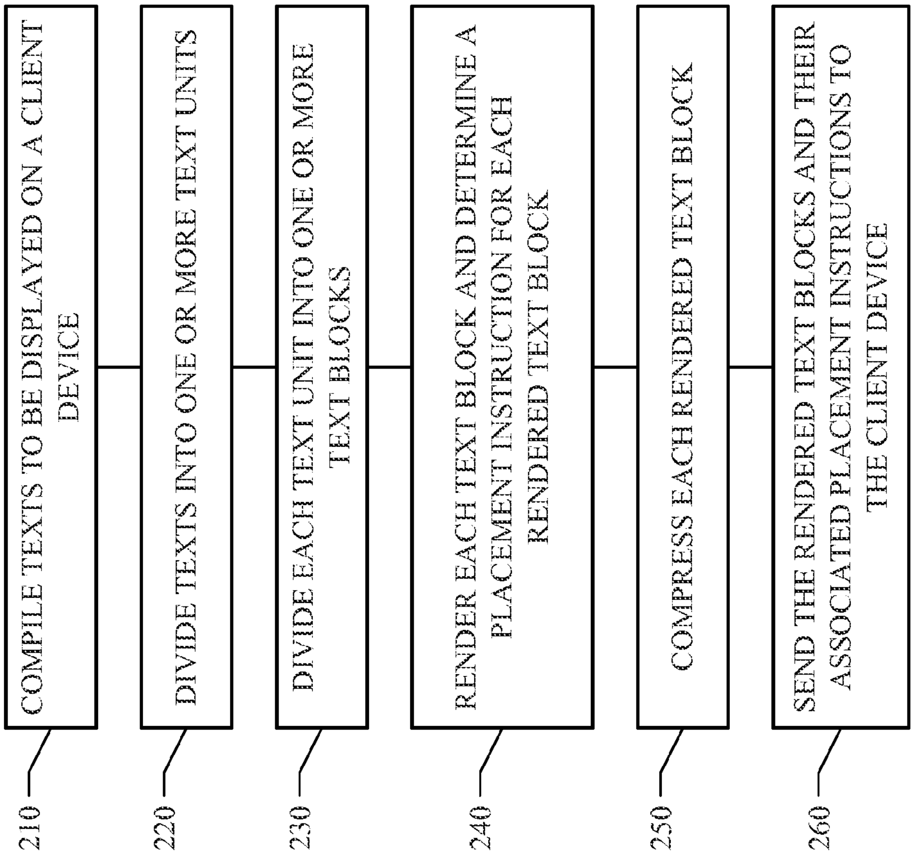
FIG. 2 illustrates an example method for rendering and displaying texts on electronic devices.

FIG. 2 illustrates an example method for rendering and displaying texts on electronic devices. Suppose that there are some texts that need to be displayed on a client electronic device (e.g., electronic device 121, which may be a mobile device). This may be in response to a client request (e.g., the client device requests some information from a server) or may be the result of a server initiative (e.g., a server wants to send a notification or message to the client device). In particular embodiments, a server (e.g., server 111) may compile the texts to be displayed on the client device (as illustrated in STEP 210). The texts may be written in any human language (e.g., alphabet based or character based) and in any font. The font of the texts may depend on the actual language the texts are in. For example, if the texts are in English, the font of the texts may be "Times New Roman", "Arial" or "Courier New". If the texts are in Chinese, the font of the texts may be "SimSun", "Han Ding", "Yellow Bridge", or "Song". If the texts are in Hebrew, the font may be "Narkisim", "Darbooka", or "Hofim". In some implementations, the texts are represented using a TrueType font.

Figure 3:
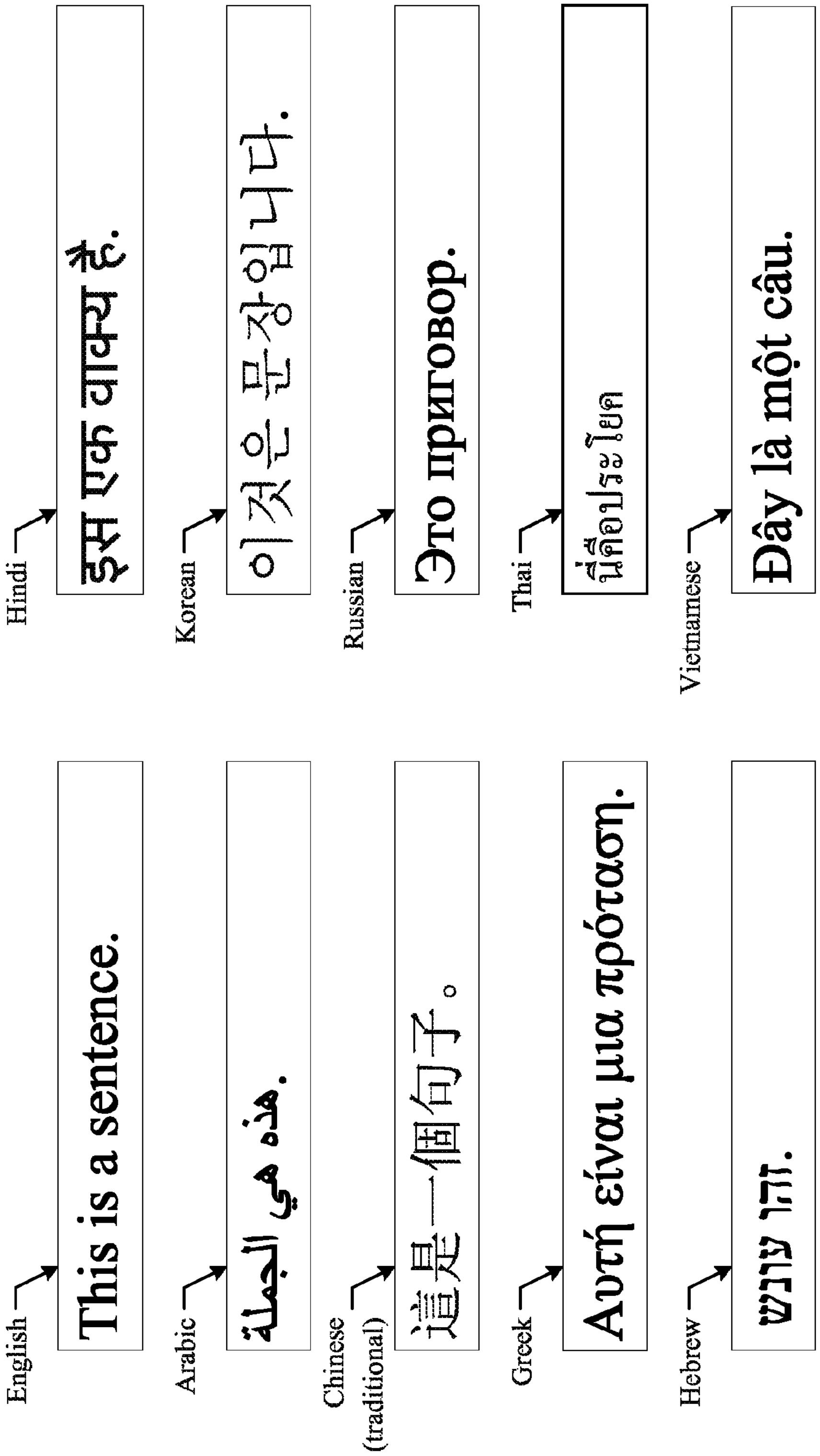
FIG. 3 illustrates an example sentence written in several different languages.

FIG. 3 illustrates an example sentence written in several different languages, including English, Arabic, traditional Chinese, Greek, Hebrew, Hindi, Korean, Russian, Thai, and Vietnamese. This illustrates how vastly different human written languages can be from each other, in terms of, for example, their structures (e.g., alphabet based vs. character based vs. script based), styles (e.g., left to right, right to left, top to bottom), and looks. Traditionally, electronically representing, rendering, and displaying these different written languages require different and special processing and handling by the individual electronic devices. With the present disclosure, however, the same process may be applied to rendering and displaying texts in any written language and any font, regardless of its specific structure or style, as well as on any type of electronic devices.

In particular embodiments, given a set of texts (e.g., a word, a phrase, a sentence, or a paragraph), the texts may be divided into a number (e.g., one or more) of text units (as illustrated in STEP 220). In some implementations, a text unit may be determined based on the structure of the specific written language the texts are in. For example, if the language is alphabet based (e.g., English, Greek, Russian), a text unit may be an individual alphabet in that language. On the other hand, if the language is character based (e.g. Chinese), a text unit may be an individual character in that language. If the language is script based (e.g., Arabic, Hindi), a text unit may be an individual symbol in that language or a script group based on the natural grouping of the scripts and the locations of the breaks between the scripts. Each text unit is then further divided into a number (e.g., one or more) of text blocks (as illustrated in STEP 230). Each text block may include at least a portion of the text unit, and all the text blocks together cover the entire text unit. In some implementations, a text block may be determined based on the structure of the specific written language the texts are in. For example, with either traditional or simplified Chinese, there are a number of character parts, and each character is usually a combination of one or more such character parts. In this case, a text block may be an individual character part. In some implementations, if the language has a Unicode representation, a text block may be an individual glyph (e.g., a writing element) that has a corresponding Unicode value.

Figure 4:
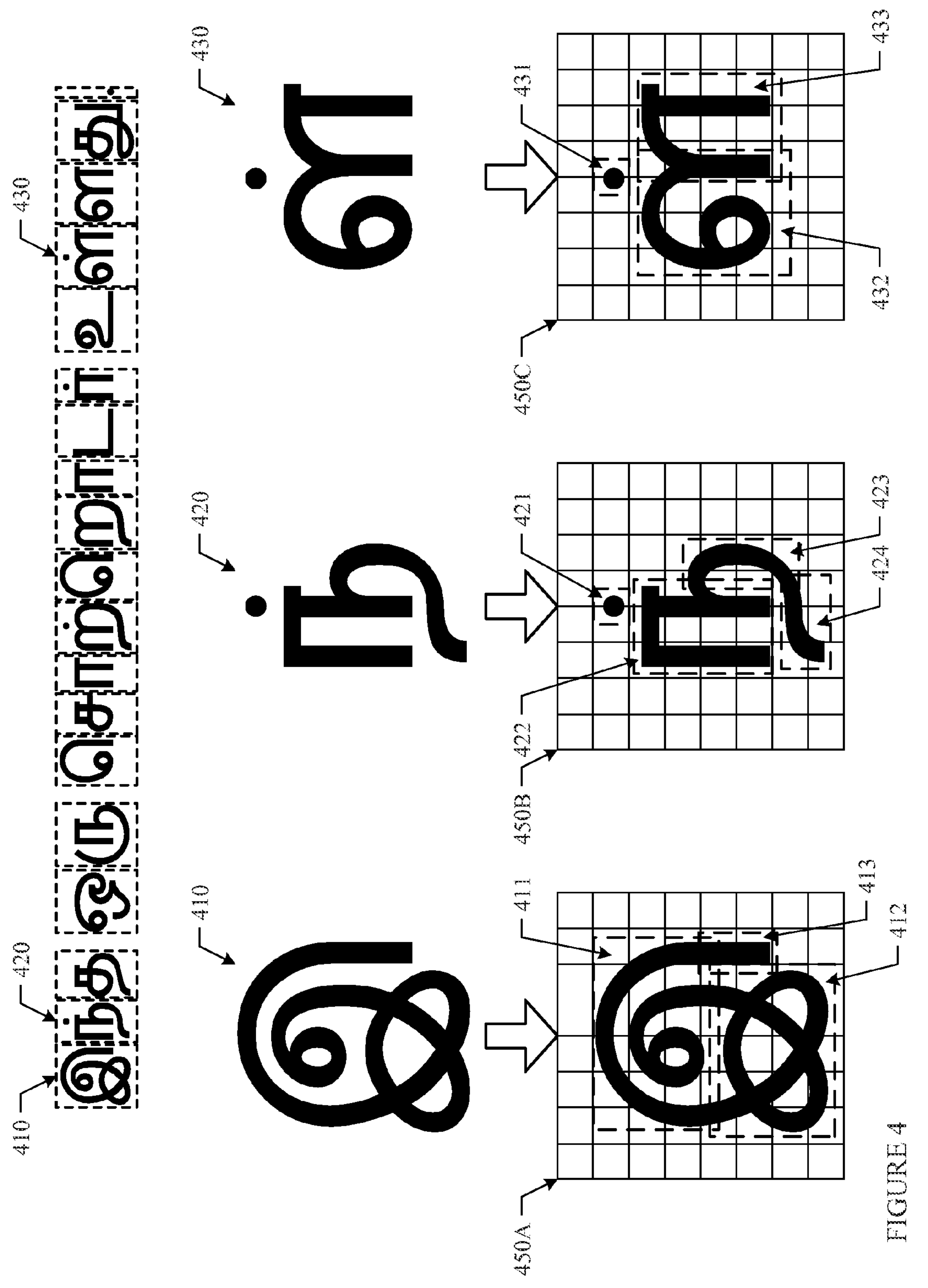
FIG. 4 illustrates several example text units, each divided into a number of text blocks.

FIG. 4 illustrates the same example sentence as illustrated in FIG. 3 written in Tamil, which is a script-based language. STEPS 220 and 230 are further explained using this example writing. In this case, the set of texts is a single sentence. The current Tamil script consists of 12 vowels, 18 consonants, and one special character, the Āytam. The vowels and consonants combine to form 216 compound characters, given a total of 247 characters. Based on this structure of the Tamil writing system, each text unit in this language may be either a vowel or a consonant or the special character or a punctuation mark. In FIG. 4, the sentence is divided into 19 text units (e.g., 410, 420, 430) because there are a total of 19 vowels, consonants, and punctuation mark included in the sentence.

Each text unit (e.g., a vowel or consonant or punctuation mark) is then further divided into one or more text blocks. As an example, consider text unit 410, which is a vowel ("இ"). This text unit is further divided into 3 text blocks, 411, 412, and 413, as marked by the dash-line rectangles. In some cases, two text blocks may partially overlap so that they share a common, and usually small, portion of the text unit. For example, text blocks 411 and 412 overlap with each other, while text block 413 overlaps with both text blocks 411 and 412. With some languages, such overlaps between text blocks may be needed, at times, in order to adequately cover each text unit or efficiently render and display each text unit. With some languages (e.g., Chinese), such overlaps between text blocks may not be necessary because of the structural characteristics of these languages. Text blocks 411, 412, and 413 together cover the entire text unit 411. Similarly, for text unit 420, it is further divided into 4 text blocks, 421, 422, 423, and 424. Text block 421 includes the dot ("•") portion of text unit 420 and does not overlap with any other text block. On the other hand, text block 423 overlaps with both text blocks 422 and 424, while there is no overlap between text blocks 422 and 424. The 4 text blocks, 421, 422, 423, and 424, together cover the entire text unit 420. Text unit 430 is further divided into 3 text blocks, 431, 432, and 433, which together cover the entire text unit 430.

In particular embodiments, each text block of each text unit is rendered for display on the client device (as illustrated in STEP 240). In some implementations, each text block may be rendered as a bitmap or raster image. For example, in FIG. 4, each square grid 450 may represent a pixel grid on the screen of a client device. For text unit 410, each of its text blocks 411, 412, 413 may occupy some of the pixels in grid 450A. For text unit 420, each of its text blocks 421, 422, 423, 424 may occupy some of the pixels in grid 450B. For text unit 430, each of its text blocks 431, 432, 433 may occupy some of the pixels in grid 450C. In some implementations, if the texts are in a TrueType font with a specific font size, each text block may be rendered based on the corresponding font definition.

In some implementations, the screen size and resolution of the client device may be taken into consideration when rendering the text blocks. For example, if the screen of the client device is relatively wide, then more text units may fit into a single line on the screen, and vice versa. Thus, given the same sentence in the same font, for some devices, it may fit into a single line on their screens, while for other devices, it may need to be broken into multiple lines. Consequently, the position of each text block, when it is displayed on the screen of a client device, may vary between different devices.

In particular embodiments, the user of the client device may be a member of a social-networking system and may register his client device with his user account with the social-networking system. In this case, when a server associated with the social-networking system needs to render texts for the specific client device associated with the user, the server may access information about the client device stored in the user's account (e.g., the device's screen size and resolution) in order to determine how best to represent and display the texts on the screen of the specific client device (e.g., text layouts and placements on the device's screen). In addition, the user may specify a preferred language for communication in his user account. In this case, when compiling texts to be displayed on this user's device, the server may translate the texts into the language preferred by the user, if necessary, before rendering the texts.

Suppose that a set of text blocks have been rendered to be displayed on the screen of a specific device. Each rendered text block, when displayed on the device's screen, should be placed at a specific position and occupies a specific number of pixels. Consequently, given a set of text blocks together representing a text unit, when these text blocks are displayed at their respective positions on the device's screen, they together should illustrate the corresponding text unit. Similarly, given multiple sets of text blocks, each set representing a different text unit in, for example, a sentence, when all the text blocks are displayed at their respective positions on the device's screen, they together should illustrate the corresponding sentence.

In particular embodiments, a number (e.g., one or more) of reference coordinates may be determined for the device's screen. In some implementations, an X-Y coordinate system may be employed. For example, a device's screen, which is usually a rectangle, may be incorporated into an X-Y coordinate system. Each pixel on the screen may be considered a single unit along either the X-axis or the Y-axis. The (0, 0) coordinate may be the lower-left pixel or the center pixel of the screen. Each reference coordinate may reference a specific pixel on the screen, and thus has a specific X-Y coordinate.

Figure 5:
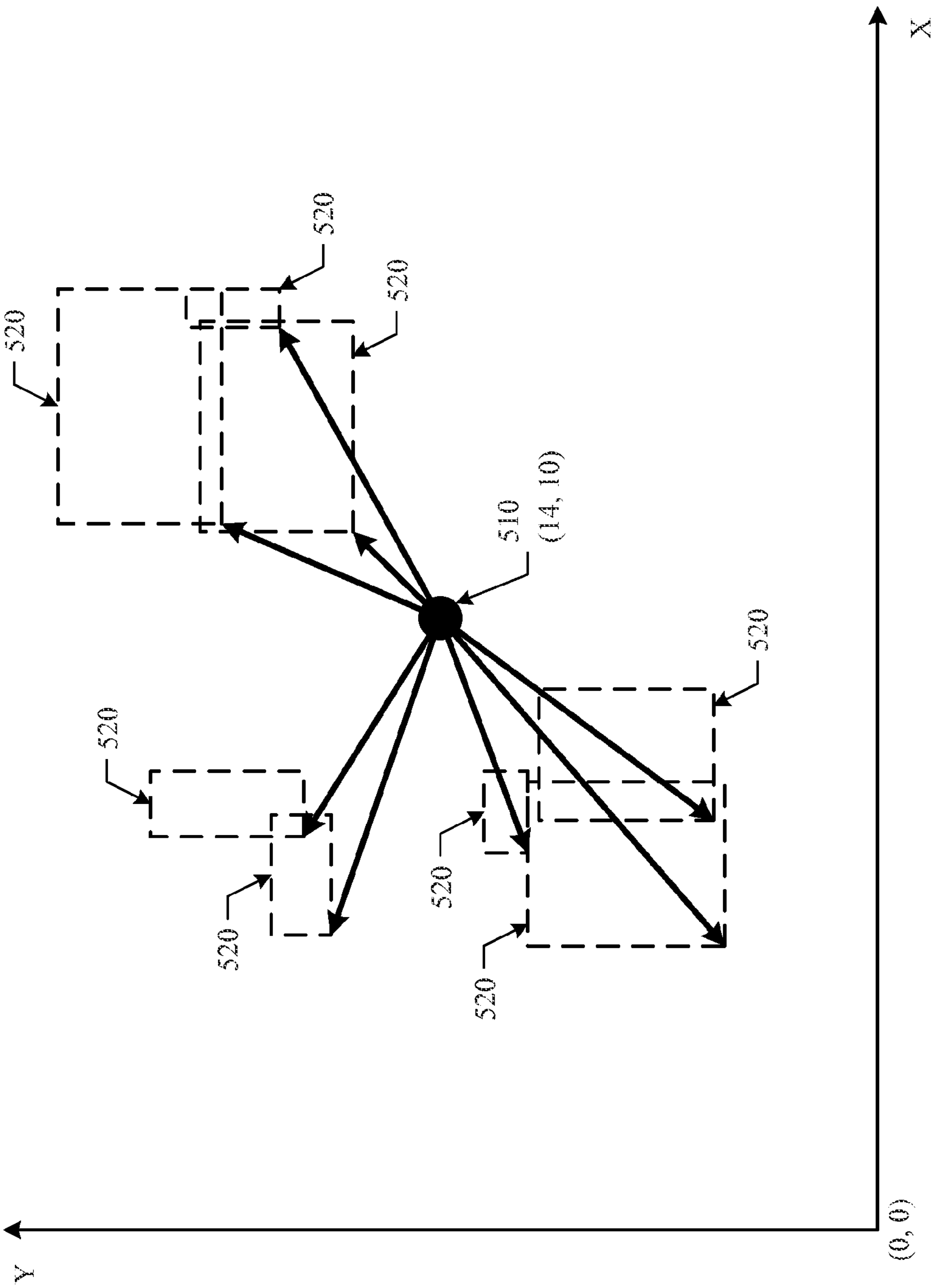
FIG. 5 illustrates an example coordinate system for offsets, in relation to a specific reference coordinate, associated with text blocks.

In particular embodiments, for each rendered text block, a placement instruction is determined (as illustrated in STEP 240). In some implementation, the placement instruction of a rendered text block may be represented as an offset in relation to one of the reference coordinates. Consider the example X-Y coordinate system illustrated in FIG. 5, which may be applied to a device's screen. In this case, the origin of the coordinate system is the lower-left pixel of the screen. There is a reference position (e.g., a specific pixel) 510 on the screen, which has a reference coordinate (e.g., (14, 10)). There are a number of text blocks 520, and each has an offset in relation to reference coordinate 510. For example, for each text block 520, its offset may be represented as a vector starting from reference coordinate 510 and ending at the lower-left corner (or alternatively, the center or one of the other corners) of text block 520. Each offset vector has a direction and a magnitude.

The reference coordinates may be selected based on different criteria. For example, in some implementations, the reference coordinates may correspond to the current cursor positions, respectively. As an example, for some Latin-based languages, as each alphabet is displayed sequentially, the current cursor position advances to the starting position of the next alphabet to be displayed, from left to right and top to bottom on the screen. Each new cursor position may correspond to a different reference coordinate. In some implementations, the reference coordinates may be selected in an effort to decrease or minimize the amount of data used to represent the offset vectors of the individual text blocks. For example, all the text blocks may be divided into a number of groups based on their respective positions on the device's screen, where text blocks that are positioned near each other are grouped together. For each group of text blocks, a reference coordinate is selected (e.g., at or near the centroid point of the text blocks in the group). The offset vector of each text block is determined in relation to the reference coordinate that is closest to that text block. As a result, each offset vector's direction and magnitude values may be sufficiently small that they may be represented using a small number of bits (e.g., 4 bits).

Figure 6:
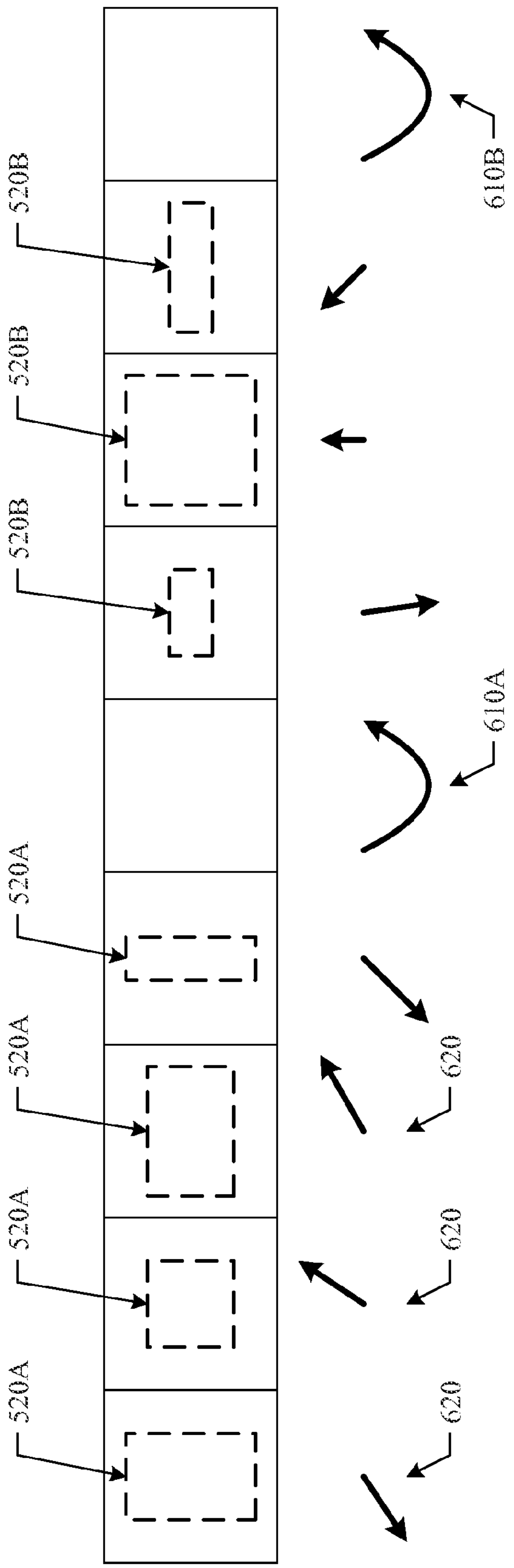
FIG. 6. illustrates several example text blocks and their respectively associated offsets.

In particular embodiments, given a set of texts (e.g., a word, a phrase, a sentence, or a paragraph), the texts may thus be represented as a sequence of rendered text blocks, each associated with a placement instruction (e.g., an offset in relation to a specific reference coordinate). FIG. 6 illustrates such an example sequence of text blocks 520, each associated with an offset vector 620 in relation to a specific reference coordinate. In some implementations, there may be multiple reference coordinates for a set of texts. Some text blocks may have offsets in relation to one reference coordinate, while other text blocks may have offsets in relation to another reference coordinate. Thus, the sequence may include a number of special tokens 610, each positioned at an appropriate place in the sequence, that indicate that the current reference coordinate should advance to the next appropriate reference coordinate. For example, in FIG. 6, text blocks 520A all have offsets in relation to one reference coordinate, while text blocks 520B all have offsets in relation to another reference coordinate. Thus, after all the text blocks 520A, there is a special token 610A indicating that the current reference coordinate should advance to the next reference coordinate, which is associated with text blocks 520B. Similarly, after all the text blocks 520B, there is another special token 610B indicating that the current reference coordinate should again advance to the next reference coordinate. In some implementations, the reference coordinates may also be included in the sequence itself. For example, in FIG. 6, at the position in the sequence corresponding to special token 610A, the reference coordinate associated with text blocks 520B may be included. Similarly, at the position in the sequence corresponding to special token 610B, another reference coordinate associated with the next group of text blocks (not shown) may be included.

In particular embodiments, each rendered text block (e.g., a bitmap or raster image) may be compressed in an attempt to decrease the amount of data needed to represent the text blocks using a suitable compression algorithm (as illustrated in STEP 250). The sequence of rendered text blocks, optionally compressed, and their associated offsets may be sent to the client device for display on the device's screen (as illustrated in STEP 260). In addition, the reference coordinates used by the rendered text blocks may also be sent to the client device, either together with the rendered text blocks or separately.

In particular embodiments, the rendered text blocks are compressed in such a way that the client device can display the rendered text blocks without having to uncompressed them first. In particular embodiments, the client device may cache some of the rendered text blocks received from the server (e.g., groups of text blocks covering frequently used alphabets or characters in a specific language). As an example, with English, the letter "e" appears frequently in various words. Thus, the client device may cache the set of rendered text blocks that represents the letter "e". As another example, with some languages, there may be specific glyphs that are frequently and repeatedly used in different alphabets or characters. Thus, the client device may cache the rendered text blocks corresponding to these frequently-used glyphs. If the client device has more resources (e.g., more memory), it can cache a relatively large number of text blocks. As a result, the server only needs to send rendered text blocks not already available with the client device.

In some embodiments, given a set of texts, it may first be divided into text blocks, and then each text block is rendered for display on a client device, as described in connection with FIG. 2. Alternatively, in other embodiments, the texts may first be rendered for display on a client device and then divided into individual text blocks. In either case, each rendered text block is associated with an offset (e.g., a vector) in relation to a specific reference coordinate.

Figure 7:
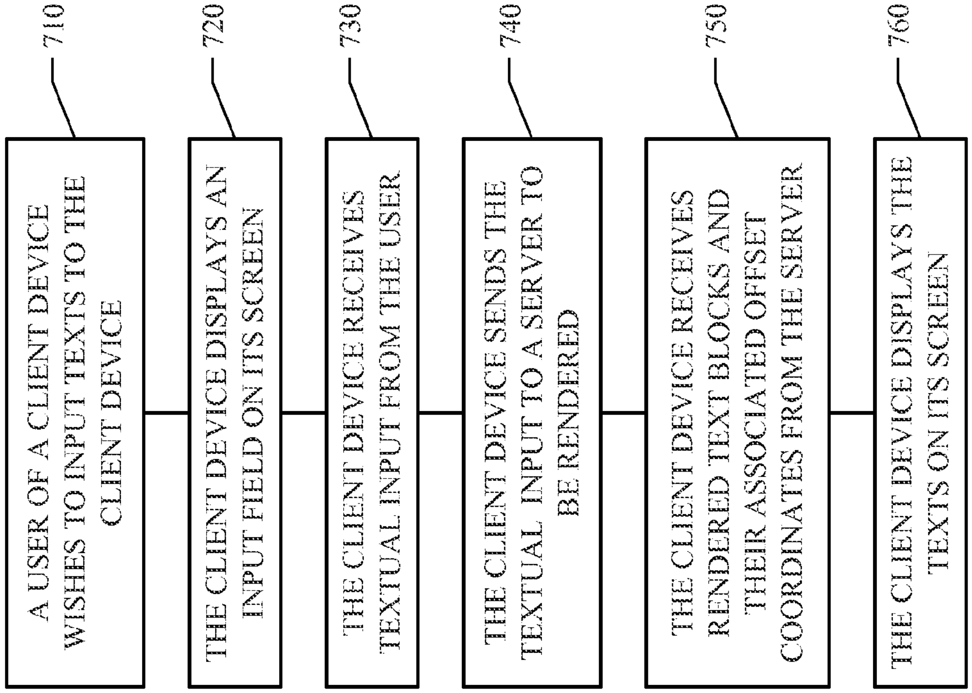
FIG. 7 illustrates an example method for displaying input texts entered by users on electronic devices.

With FIG. 2, in particular embodiments, the texts to be displayed on the client device originate from a server. The process may similarly be applied to display texts inputted to a client device by its user. FIG. 7 illustrates an example method for displaying input texts entered by users on electronic devices.

Suppose that a user of a client device wishes to input texts to the device (as illustrated in STEP 710). The client device may display a text input field on its screen (as illustrated in STEP 720). The user may type texts in the input field using a keypad or an on-screen character map, and the client device may receive the user input (as illustrated in STEP 730). In particular embodiments, the client device may send the user's text input to a server to be rendered using the process illustrated in FIG. 2 (as illustrated in STEP 740). In some implementations, the user's text input may be represented as a sequence of keystrokes. As described above, the server may divide the text input into text blocks, render each text block, compress each text block, and determine an offset for each text block. The server may then send a sequence of rendered text blocks together with their associated offsets, which represent the user's text input, back to the client device (as illustrated in STEP 750). The client device, upon receiving the rendered text blocks together with their associated offsets, may display the texts on its screen (as illustrated in STEP 760).

By using the process illustrated in FIG. 7, a client device no longer needs to implement special functionalities to support and handle user input in various languages. For example, the same version of a mobile telephone may be distributed and sold in many different countries speaking different languages. The mobile telephones rely on the servers to process and render texts in different languages and fonts. The mobile telephones only need to display already rendered text blocks based on the information (e.g., reference coordinates, offsets) provided by the servers.

For some languages, rendered text blocks may be cached and reused by client devices. For example, with Korean, there is a relatively small set of "character parts" (or Korean alphabets) that may be combined differently to form different words. Each character part may be represented as a text block. A client device may, for example, cache some or all of the rendered text blocks representing these character parts. Then, to form different words, the server only needs to send the client device the appropriate placement instructions (e.g., offsets in relation to reference coordinates) for the specific rendered text blocks representing the specific character parts. The client device may reuse the rendered text blocks by positioning and displaying them at multiple positions on the screen based on the placement instructions received from the server. For example, if a specific character part is used to form three different words (e.g., combined with other character parts), the server may send three different placement instructions indicating three appropriate positions on the client device's screen where that character part should be placed. The client device may then display the rendered text block representing that character part at these three positions.

In particular embodiments, when displaying some texts, if a client device needs a rendered text block that is already available on the client device (e.g., the client device has a cached copy of the rendered text block), the server only needs to send the placement instructions for that rendered text block to the client. On the other hand, if the client device needs a rendered text block that is not yet available to the client device (e.g., the client device has not cached this particular rendered text block or has never received this rendered text block from the server), the server needs to send the rendered text block (e.g., in compressed form) as well as its associated placement instructions to the client. As described above, in some implementations, the placement instructions are represented in such a away that it does not take too many bits to encode the information. On the other hand, the rendered text blocks (e.g., as bitmap or raster images), even in compressed form, may require a relatively large number of bytes to encode. While sending both rendered text blocks and their associated placement instructions may slightly increase the amount of data initially sent from a server to a client device, since the client device can cache the rendered text blocks for reuse, subsequently, only new placement instructions need to be sent. In the long term, this decreases the total amount of data the sever needs to send to the client.

In particular embodiments, the entire language-specific logic is maintained and managed by the servers. The clients are kept language neutral and do not need to worry about processing texts in different languages. In fact, the clients may not have any concept of the languages being rendered. They receive rendered text blocks (e.g., as images) from the servers and follow the placement instructions (e.g., offsets) provided by the servers in order to place the rendered text blocks at the correct positions on the screens. Because all the language and font processing is done on the server side, if there is any problem or improvement after a client has been installed, the user does not need to reinstall a new client. The server can send the updated rendered text blocks and placement instructions to the client when needed.

Figure 8:
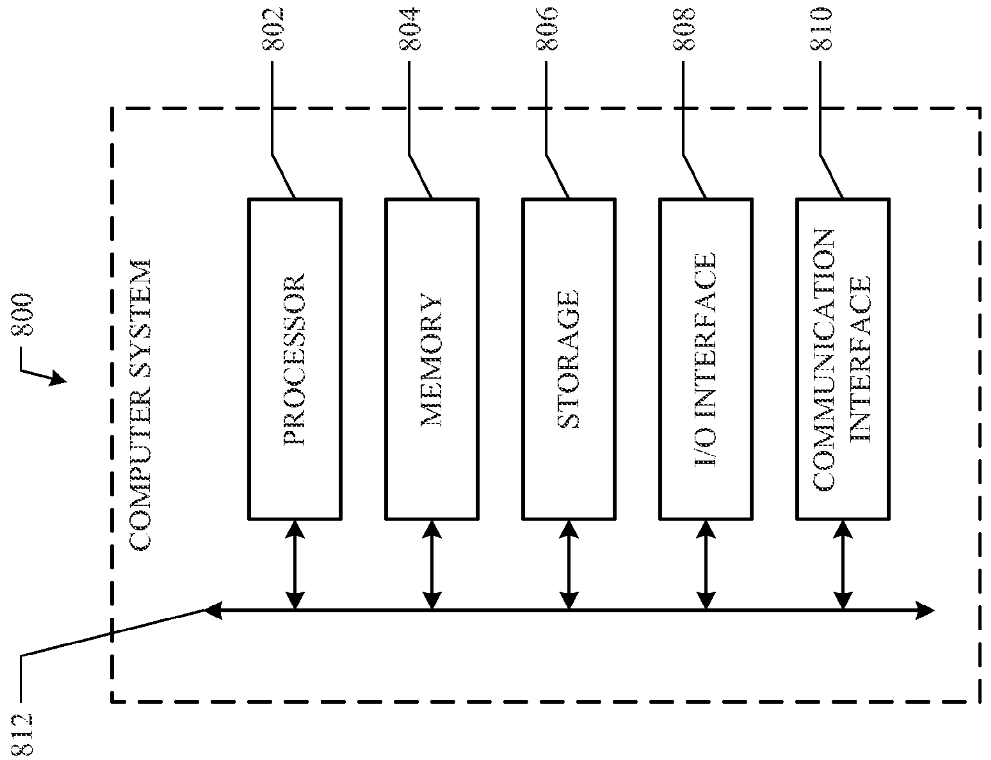
FIG. 8 illustrates an example computer system.

Particular embodiments may be implemented on one or more computer systems. FIG. 8 illustrates an example computer system 800, which may implement servers 111, 113, or 115 illustrated in FIG. 1. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices, dividing a set of texts into one or more text blocks, each text block including a portion of the set of texts;

rendering each text block to obtain one or more rendered text blocks;

selecting one or more reference coordinates for the set of texts;

determining a placement instruction for each rendered text block based on determining an offset for each rendered text block in relation to one of the one or more reference coordinates, the placement instruction indicating a position of the rendered text block when it is displayed; and sending the one or more rendered text blocks and their respectively associated placement instructions to an electronic device for displaying on the electronic device, wherein each text block of the set of texts is associated with one of the one or more reference coordinates, and wherein the placement instructions indicating the positions of the rendered text blocks further comprises using a token to indicate a change in the reference coordinate between two consecutive text blocks.

2. The method of claim 1, wherein determining the placement instruction for each rendered text block further comprises:

selecting one of the one or more reference coordinates; and determining a vector from the selected one reference coordinate to the rendered text block based on the determined offset for each rendered text block.

3. The method of claim 2, wherein the one or more reference coordinates corresponds to:

a current cursor position, or a centroid point of each of the one or more text blocks.

4. The method of claim 3, wherein the selected one reference coordinate corresponds to the reference coordinate that is closest to the rendered text block.

5. The method of claim 1, wherein a position between two consecutive text blocks of a first text block and a second text block comprises the token and data on the reference coordinate associated with the second text block.

6. A system comprising: a memory comprising instructions executable by one or more processors; and the one or more processors coupled to the memory and operable to execute the instructions, the one or more processors being operable when executing the instructions to:

divide a set of texts into one or more text blocks, each text block including a portion of the set of texts;

render each text block to obtain one or more rendered text blocks;

select one or more reference coordinates for the set of texts;

determine a placement instruction for each rendered text block based on determining an offset for each rendered text block in relation to one of the one or more reference coordinates, the placement instruction indicating a position of the rendered text block when it is displayed; and send the one or more rendered text blocks and their respectively associated placement instructions to an electronic device for displaying on the electronic device, wherein each text block of the set of texts is associated with one of the one or more reference coordinates, and wherein the placement instructions indicating the positions of the rendered text blocks further comprises using a token to indicate a change in the reference coordinate between two consecutive text blocks.

7. The system of claim 6, wherein determining the placement instruction for each rendered text block further comprises:

selecting one of the one or more reference coordinates; and determining a vector from the selected one reference coordinate to the rendered text block based on the determined offset for each rendered text block.

8. The system of claim 7, wherein the one or more reference coordinates corresponds to:

a current cursor position, or a centroid point of each of the one or more text blocks.

9. The system of claim 8, wherein the selected one reference coordinate corresponds to the reference coordinate that is closest to the rendered text block.

10. The system of claim 5, wherein a position between two consecutive text blocks of a first text block and a second text block comprises the token and data on the reference coordinate associated with the second text block.

11. One or more computer-readable non-transitory storage media embodying logic that is operable when executed to:

divide a set of texts into one or more text blocks, each text block including a portion of the set of texts;

render each text block to obtain one or more rendered text blocks;

select one or more reference coordinates for the set of texts;

determine a placement instruction for each rendered text block based on determining an offset for each rendered text block in relation to one of the one or more reference coordinates, the placement instruction indicating a position of the rendered text block when it is displayed; and send the one or more rendered text blocks and their respectively associated placement instructions to an electronic device for displaying on the electronic device, wherein each text block of the set of texts is associated with one of the one or more reference coordinates, and wherein the placement instructions indicating the positions of the rendered text blocks further comprises using a token to indicate a change in the reference coordinate between two consecutive text blocks.

12. The system of claim 11, wherein determining the placement instruction for each rendered text block further comprises:

selecting one of the one or more reference coordinates; and determining a vector from the selected one reference coordinate to the rendered text block based on the determined offset for each rendered text block.

13. The system of claim 12, wherein the one or more reference coordinates corresponds to:

a current cursor position, or a centroid point of each of the one or more text blocks.

14. The system of claim 13, wherein the selected one reference coordinate corresponds to the reference coordinate that is closest to the rendered text block.

15. The system of claim 11, wherein a position between two consecutive text blocks of a first text block and a second text block comprises the token and data on the reference coordinate associated with the second text block.

* * * * *